United States Patent Office 3,232,675
Patented Feb. 1, 1966

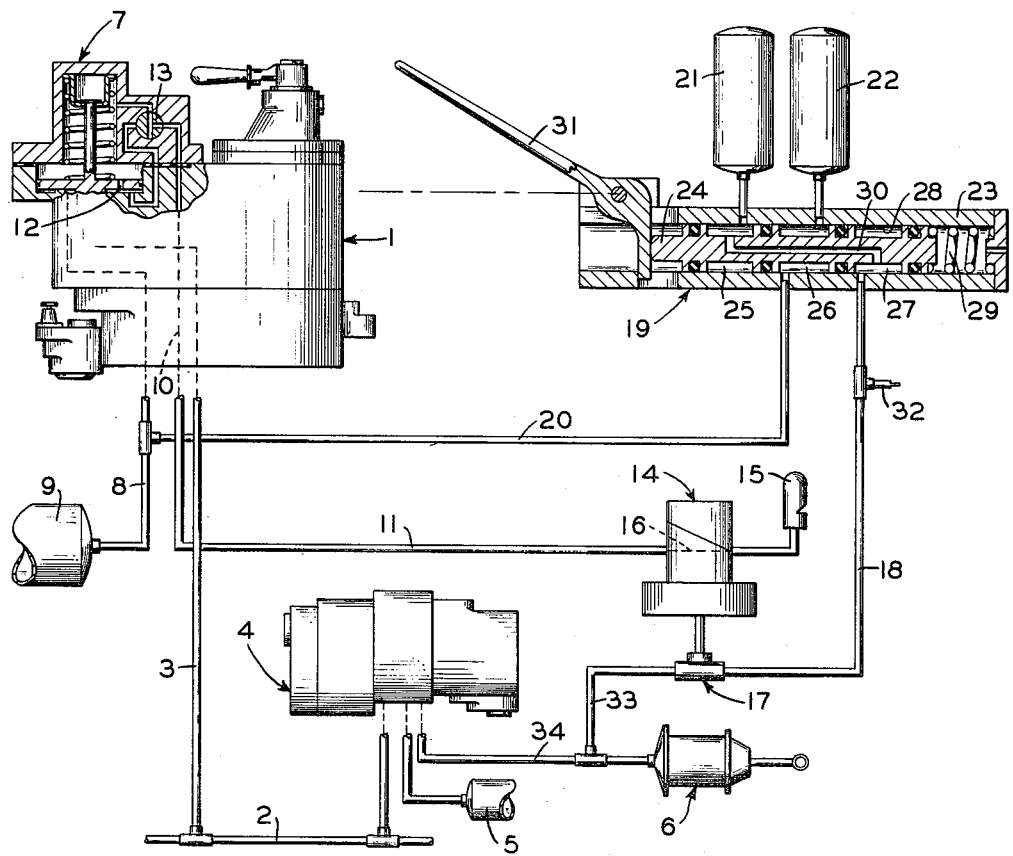
INVENTOR.
JAMES F. FERGUSON
BY
*A. A. Steinmiller*
ATTORNEY

3,232,675
FLUID PRESSURE BRAKE APPARATUS WITH PERIODIC ACKNOWLEDGMENT TYPE SAFETY CONTROL
James F. Ferguson, Westmoreland, Pa., assignor to Westinghouse Air Brake Company, Wilmerding, Pa., a corporation of Pennsylvania
Filed July 9, 1963, Ser. No. 293,755
7 Claims. (Cl. 303—19)

This invention relates to fluid pressure operable brake apparatus with periodic acknowledgment safety control means which requires certain periodic acknowledging operations by the operator of the vehicle to forestall a penalty control operation, such as a brake application, which will otherwise be effected automatically by the safety control means should the operator fail to perform said acknowledging operations.

A safety control device or apparatus may be associated with the braking system of a vehicle for the purpose of insuring that the vehicle brakes would be applied automatically in the event that the operator of a vehicle, such as a railway train, for example, becomes incapacitated for performing his duties. Some of the presently known devices, such as a "dead-man" valve, which requires that the operator positively depress a foot pedal associated therewith to prevent a brake application from being effected automatically, are inadequate in that the purpose thereof can be easily defeated by the operator placing a weight on the foot pedal to hold it depressed. Other safety control apparatus have been devised which require periodic acknowledging operations by the operator, the interval of frequency of such periodic acknowledging operations being determined in some instances by a fixed period of time, in others a fixed distance traveled by the vehicle, while in others the time interval is related to the rate of speed of the vehicle so that the higher the rate of speed, the shorter the time interval and hence the greater the frequency of acknowledgment operation. Some of the latter-mentioned apparatus are complex in structure and function and are therefore susceptible to malfunctioning and failure as well as being costly to produce.

Accordingly, the object of this invention is to provide an improved safety control apparatus of the periodic acknowledging type for use with fluid pressure brake apparatus and for use primarily with railway locomotive brake equipment, though not necessarily limited to such use, said improved safety control apparatus being characterized by simplicity in structure and therefore more reliability in operation.

The invention comprises a fluid pressure operable cycling safety control circuit interposed in the safety control pipe between the engineer's automatic brake valve and a signaling device, such as a whistle, via which whistle fluid pressure may be released at a restricted rate from said safety control pipe unless otherwise checked. As is well known, reduction of fluid pressure in the safety control pipe, unless checked before reaching a certain low value, will effect a penalty brake application. In accordance with the invention, the safety control circuit comprises a two-position relay valve device having a fluid pressure control chamber and interposed in the safety control pipe, said relay valve device being operable responsively to fluid in said control chamber at a pressure above a predetermined value, or what may be called a change-over pressure, for closing said safety control pipe to atmosphere, and to reduction of such fluid pressure in said control chamber to a pressure below said change-over pressure for opening said safety control pipe to atmosphere via the whistle. A pair of timing reservoirs is so arranged with a pressurized fluid source and a foot valve device as to be alternately connectable to the control chamber of the relay valve device by operation of a foot pedal, associated with said foot valve device, between a raised position and a depressed position, and reversely. In the raised position of the foot pedal, the foot valve device is operative to connect one of the timing reservoirs which has been previously charged with pressurized fluid to the control chamber of the relay valve device, and the other timing reservoir to the pressurized fluid supply pipe for recharging it; in the depressed position of the foot pedal, the connections are reversed, that is, the other timing reservoir, which is now recharged, is connected to the control chamber and the one timing reservoir, which is now depleted of fluid pressure, is connected to the supply to be recharged. The control chamber of the relay valve device is constantly open to atmosphere via a vent choke so as to cause the fluid pressure therein and in the timing reservoir connected thereto at the time to be dissipated according to the volume of the reservoirs and the flow rate of said choke. Thus, each time the pressure in the control chamber is reduced below the change-over pressure to cause the safety control pipe to be opened to atmosphere and thereby cause the whistle to be sounded, the operator immediately shifts the position of the foot pedal to cause restoration of fluid pressure in the control chamber to a pressure above the change-over pressure and thereby reclosing of the safety control pipe to atmosphere, thus preventing sustained reduction of fluid pressure in the safety control pipe and a possible penalty brake application.

The single figure drawing shows a schematic arrangement, partly in section, of a safety control circuit with a brake system of a railway locomotive and embodying the invention.

Description and operation

For purposes of illustrating an application of the safety control apparatus embodying the invention, said apparatus is shown in the drawing as being operatively connected to brake control equipment of the fluid pressure operable type of a railway locomotive. The locomotive brake control equipment may be of any suitable type such as that fully described and illustrated in Instruction Pamphlet No. 5066, dated March 1957, and published by Westinghouse Air Brake Company, said equipment being designated "24–RL Locomotive Brake Equipment." Since a detailed description of the brake control equipment is not deemed essential to an understanding of the invention and since reference may be had to the above-mentioned publication, the brake control equipment as shown in the drawing will be only very briefly described. Such equipment comprises an engineer's automatic brake valve device 1 designated in the above-mentioned pamphlet as the "DS-24 Brake Valve" and manually operable by the engineer for controlling fluid pressure in a brake pipe 2 connected via a branch pipe or conduit 3 to said engineer's brake valve device. As is well known by those skilled in the art, operation of the engineer's brake valve device 1 for effecting a reduction of fluid pressure in the brake pipe 2 causes a brake control valve device 4, designated in the above-mentioned pamphlet as the "D-24 Control Valve," to effect supply of fluid under pressure from a source such as an auxiliary reservoir 5 to a brake cylinder device 6, whereby a brake application corresponding to the degree of reduction in brake pipe pressure is applied to the locomotive wheels (not shown). Operation of the automatic brake valve device 1 for effecting restoration of fluid pressure in the brake pipe 2 to a preselected normal value causes the brake control valve device 4 to effect venting of brake-applying pressure from the brake cylinder device 6 and thereby release of the brake application.

One of the components of the automatic brake valve device 1 is an application portion 7 comprising valve means (not shown) operated by a piston subjected on one side to fluid pressure in a pressure chamber adjacent thereto, said chamber being supplied with fluid under pressure via a pipe 8 from a source such as a main reservoir 9 which may be charged with fluid at a pressure of 140 p.s.i., for example, while the opposite side of said piston is subjected to the force of a biasing spring and fluid pressure in a control chamber adjacent thereto, said control chamber having one end of a safety control passage 10 opening thereinto, while the other end of said control passage connects to one end of a safety control pipe 11. Both the passage 10 and the pipe 11 are charged, at a restricted rate, from the main reservoir 9 via the pressure chamber and the control chamber of the application portion 7, which are connected by a choked passage 12 extending through the piston from one side thereof to the other. When fluid pressure in the control passage 10 and therefore in the control chamber is reduced below a preselected critical low value such as 90 p.s.i., for example, the piston-operated valve means is actuated by the opposing pressure in the pressure chamber to a brake application position, whereby the automatic brake valve device 1 is actuated to cause a reduction of fluid pressure in brake pipe 2 for effecting a brake application, as above described. When fluid pressure in the control passage 10 is restored to a value above 90 p.s.i., the piston-operated valve means is returned to a normal position in which the brake valve device 1 effects restoration of normal fluid pressure in the brake pipe 2, and the control valve device 4 effects a release of the brake application.

It should be understood that each of the cars making up a train is provided with a brake control valve device similar to the brake control valve device 4, and that the brake pipe 2 extends the entire length of the train so that the brakes on the entire train are controlled from the engineer's automatic brake valve device 1.

In locomotive brake equipment of the type above described, the safety control passage 10 is normally connected via pipe 11 to a safety control device or devices such as the "dead-man" valve device above described and an audible or visible warning device for indicating that the safety control devices have been actuated in response to an emergency situation.

A cut-out cock 13, manually operable from the exterior of the automatic brake valve device 1, is interposed in safety control passage 10 between the control chamber of the service application portion 7 of said valve device and the pipe 11, thereby, in the event of undesirable pressure reduction in said safety control passage due to malfunctioning of the safety control devices or excessive leakage of fluid pressure in the safety control system, the cut-out cock may be operated to a closed position to cut off communication between said service application portion and the safety control devices to prevent untimely application of the brakes due to said malfunctioning of said safety control devices or excessive leakage therein. The cut-out cock 13 is normally sealed in an open position with a breakable seal (not shown) which the operator is permitted to break for closing the cut-out cock in an emergency situation only, such as above described.

According to the invention, a two-position relay valve device 14 is interposed in the safety control pipe 11 between the engineer's brake valve device 1 and a vent device, such as a whistle 15, which permits fluid pressure to escape from said safety control pipe to atmosphere at a restricted rate when communication through said safety control pipe is open, as is to be immediately explained. The relay valve device 14 comprises piston-operated valve means (not shown) spring biased toward an open position in which a communication 16, indicated diagrammatically in the drawing by a broken line, is opened to place the safety control pipe in communication with atmosphere via the whistle 15 for effecting venting thereof. The piston-operated valve means in the relay valve device 14 is operable responsively to fluid in a control chamber (not shown) at a pressure above a predetermined value, or what may be called a change-over pressure (sufficient for overcoming the opposing force of the biasing spring acting on said valve means), to a closed position, indicated diagrammatically in the drawing by a solid line, in which communication 16 is closed for cutting off venting of the safety control pipe 11 to atmosphere. The magnitude of the opposing force of the biasing spring in the relay valve device 14 and the degree of the change-over pressure will be more fully discussed hereinafter.

The control chamber of the relay valve device 14 is connected via a double check valve device 17, the purpose of which will be hereinafter explained, and a delivery pipe 18 to a foot valve device 19, said foot valve device also being connected via a supply pipe 20 and pipe 8 to the main reservoir 9. Also connected to the foot valve device 19 are two timing reservoirs 21 and 22.

The foot valve device 19 comprises a casing 23 in which a spool type valve 24, provided with annular grooves or recesses 25, 26 and 27, is slidably operable in a coaxial bore 28 formed in said casing, said grooves 25 and 26 being constantly in registry with the timing reservoirs 21 and 22, respectively, which connect to said coaxial bore. The supply pipe 20 connecting to main reservoir 9 also opens to the coaxial bore 28 of the foot valve device 19, as does delivery pipe 18 connecting with the control chamber in the relay valve device 14.

The spool valve 24 is biased by a spring 29 toward a first supply position in which it is shown in the drawing and in which supply pipe 20 is placed in communication with timing reservoir 22 via groove 26, while delivery pipe 18 is placed in communication with timing reservoir 21 via groove 27, groove 25 and a passageway 20 in said spool valve interconnecting said grooves 25 and 27. The spool valve 24 is operable to a second supply position by depression of a pivotally mounted foot pedal 31 out of an upper or raised position in which it is shown in the drawing to a lower or depressed position indicated by a broken line in the drawing. In its second supply position, spool valve 24 cuts off communication between pipe 20 and reservoir 22 and between pipe 18 and reservoir 21, while placing pipe 20 in communication with reservoir 21 via groove 25 and placing pipe 18 in communication with reservoir 22 via groove 26.

In considering the operation of the apparatus embodying the invention, it may be assumed that the vehicle on which said apparatus is mounted is under way and in motion, that the brakes (not shown) are in a released state, that main reservoir 9 is fully charged with pressurized fluid, and that foot pedal 31 has just been released by the operator (in response to an audible signal from the whistle 15 which occurs when the valve means in the relay valve device 14 is in its open position to open control pipe 11 to atmosphere via said whistle, as above described) to its upper position in which spool valve 24 is in its first supply position, above described.

With spool valve 24 in its first supply position, reservoir 22 is connected to supply pipe 20 to be charged with pressurized fluid therefrom, while pressurized fluid from reservoir 21, which has been charged with fluid at a pressure above the change-over pressure from supply pipe 20 and is now cut off therefrom, flows via pipe 18 to the control chamber of the relay valve device 14 for causing the valve means therein to be operated to its closed position to close communication 16 and thereby cut off venting of the safety control pipe 11 to atmosphere via whistle 15 and stop the whistle sound. As long as the whistle remains silent, the operator allows the foot pedal 31 to remain in its last-assumed position. Pressurized fluid supplied from reservoir 21 is effective in the control chamber of the relay valve device 14 for retaining the valve means therein in its closed position, but only for a period of time it takes such pressurized fluid in said reservoir and said control chamber to be reduced to a pressure below the change-over pressure via an atmospheric vent choke 32 interposed in pipe 18 between foot valve device 19 and the double check valve device 17, said period of time being determined by the flow rate of said vent choke and the volume of said reservoir. When fluid pressure in reservoir 21 and therefore in the control chamber of the relay valve device 14 has reduced below the pressure effective for retaining the piston-operated valve means of the relay valve device in its closed position or the change-over pressure, said piston-operated valve means is moved by the biasing spring to its open position to thereby open communication 16 and the safety control pipe 11 to atmosphere via whistle 15 whence a warning sound is again emitted. Upon hearing the warning sound, the operator depresses foot pedal 31 from its upper position to its lower position. The rate at which the whistle 15 permits fluid pressure to escape from the safety control pipe 11 when the relay valve device valve means is in its open position is so restricted as to allow the operator sufficient time, such as four to six seconds, to change the position of the foot pedal 31 before a penalty brake application occurs. The operator will hold the foot pedal 31 in its lower position until he hears the whistle sound anew.

With foot pedal 31 in its lower position and therefore spool valve 24 in its second supply position, reservoir 21 is cut off from pipe 18 and connected to supply pipe 20 to be recharged therefrom, and pipe 18 is connected to reservoir 22 from which pressurized fluid is now supplied to the control chamber of the relay valve device 14 for restoring the piston-operated valve means to its closed position to cut off venting of safety control pipe 11 and terminate the whistle sound until such pressure in said control chamber is again reduced below the change-over pressure via vent choke 32. When this occurs, safety control pipe 11 is again opened to atmosphere via the whistle 15, in the manner above described, from which a warning sound is emitted to once again apprise the operator that said safety control pipe is open to atmosphere. Upon hearing the whistle again, the operator causes the foot pedal 31 to change over from its lower position to its upper position for effecting operation of the piston-operated valve means in the relay valve device 14, as above described.

Thus, each time the operator hears a warning signal from the whistle 15, he alternately depresses and releases foot pedal 55 to effect, in the manner above described, cycling action of the relay valve device 14, the duration of each cycle being determined, as was above noted, by the respective capacities of the timing reservoirs 21 and 22 and the flow rate of vent choke 32. By performing the required operation in response to each warning sound emitted by the whistle 15 and thereby preventing a penalty brake application, the operator demonstrates his alertness. On the other hand, if the operator fails to respond due to his becoming incapacitated, a brake application is automatically effected to bring the train or vehicle to a stop and thereby prevent any damaging results.

Since the main purpose of the invention as above stated is to have the operator demonstrate his alertness by having to perform the functions above described to avert a penalty brake application, it follows that he should not be required to perform said functions if he is preoccupied with other duties which indicate and demonstrate his alertness. One such instance occurs at the time that the operator initiates a brake application by operating the engineer's automatic brake valve device 1, during which time it would be desirable to render the safety control circuit ineffective and thereby relieve the operator of the necessity of operating the foot pedal 31 when he is demonstrating his alertness otherwise.

As was noted above, the control chamber of the relay valve device 14 is connected to pipe 18 via the double check valve device 17, which has the usual valve member (not shown) subjectable to respective opposing fluid pressures on opposite sides thereof and shiftable to one of two positions, depending upon which side is subjected to the greater pressure. The valve member in the double check valve device 17 is subjected on one side to the prevailing pressure in pipe 18 and on the opposite side to the prevailing pressure in a pipe 33 connecting said double check valve device to a supply pipe 34 via which pressurized fluid is supplied to the brake cylinder 6 when a brake application is effected.

The compression rating of the biasing spring in the relay valve device 14 should be such as to be yieldable to a minimum degree of fluid pressure required for the brake cylinder 6 to effect a service brake application, such as 25 p.s.i., for example, or the pressure corresponding to the above-defined change-over pressure, so that if the operator initiates a brake application by operating the engineer's brake valve 1, pressurized fluid supplied via pipe 34 to said brake cylinder would also prevail in pipe 33. While the operator is occupied with operating the engineer's brake valve 1 and during such time that a brake application, so initiated, is in effect, he may ignore the foot pedal 31 because, even if fluid pressure in pipe 18 and the timing reservoir 21 (which would be the one connected to pipe 18 if said foot pedal were in its upper position, for example) has been exhausted or reduced below the change-over pressure, the pressure prevailing in pipe 33 would cause shifting of the valve member in the double check valve device 17 to connect said pipe 33 to the control chamber of the relay valve device 13 and therein prevail to retain the piston-operated valve means in its closed position and prevent venting of the safety control pipe 11.

When the operator effects a release of the brake application by causing fluid pressure to be released from the brake cylinder 6, such fluid pressure in pipe 33 and in the control chamber of the relay valve device 14 is also released, and the piston-operated valve means in said relay valve device is moved to its open position by the biasing spring. The safety control pipe 11 is therefore opened to atmosphere via communication 16 and the whistle 15 which emits a warning sound. Upon hearing the warning sound, the operator resumes periodic operation of the foot pedal 31 between its upper and lower position as above described to demonstrate his alertness and thereby avert a penalty brake application.

Having now described the invention, what I claim as new and desire to secure by Letters Patent, is:

1. A fluid pressure safety control system comprising:
 (a) a fluid pressure operated device normally biased toward one position and being operable responsively to fluid pressure above a critical value to a different position,
 (b) a source of fluid under pressure,
 (c) a pair of timing reservoirs,
 (d) a manually controlled valve device alternately operable between a first position and a second position, and reversely, for alternately supplying fluid at a pressure above said critical value to said fluid pressure operated device from one or the other of said timing reservoirs, said manually controlled valve device being so arranged with said source of fluid under pressure and said timing reservoirs as to cause, when in its said first position, the other of said timing reservoirs to be charged with pressurized fluid from said source while the one of said reservoirs is supplying pressurized fluid to said fluid pressure operated device, and vice versa upon operation of the manually controlled valve device to its said second position,
 (e) a vent choke via which said fluid pressure operated device is constantly vented to atmosphere and via which pressurized fluid supplied thereto from one or the other of said timing reservoirs is reduced to a value below said critical value upon expiration of a first predetermined time interval of supply for effecting restoration of said fluid pressure operated device to its said one position, and (f) means controlled by said fluid pressure operated device and effective, upon expiration of a second predetermined time interval following restoration of said fluid pressure operated device to its said one position, to induce a penalty control operation unless operation of said fluid pressure operated device to its said different position is effected before expiration of said second predetermined time interval by operation of said manually controlled valve device from one to the other of its said first or second positions.

2. In a vehicle fluid pressure brake system, the combination with brake application valve means operatively responsive to a predetermined reduction of a control fluid pressure to effect a penalty brake application of the vehicle, of:

(a) fluid pressure operated valve means normally biased toward an open position, in which reduction of the control pressure is effected, and being operable responsively to fluid pressure above a critical value to a closed position in which such reduction of the control pressure is terminated, (b) a vent choke via which said fluid pressure operated valve means is constantly open to atmosphere and via which pressurized fluid supplied thereto is dissipated therefrom at a rate slower than that at which it is supplied, (c) a source of fluid under pressure, (d) a pair of timing reservoirs, and (e) a manually controlled valve device operable from one position to another, and reversely, for alternately supplying fluid at a pressure above said critical value to said fluid pressure operated valve means from one or the other of said timing reservoirs, said manually controlled valve device being so arranged with said source of fluid under pressure and said timing reservoirs as to cause said other reservoir to be charged with pressurized fluid from said source while the one reservoir is supplying pressurized fluid to the fluid pressure operated valve means and vice versa upon operation of the manually controlled valve device to its other position.

3. The combination as claimed in claim 2, further characterized by:

(a) manually controlled means for effecting a brake application on the vehicle, and (b) means responsive to a brake application effected by said manually controlled means for effecting a constant supply of fluid to said fluid pressure operated valve means at a pressure above said critical value during such time that said brake application is in effect, thereby obviating the necessity for operation of said manually controlled valve device to prevent a penalty brake application.

4. The combination as claimed in claim 2, further characterized by restricted vent means of predetermined flow capacity via which the control fluid pressure is reduced when the fluid pressure operated valve means is in its open position, thereby effecting a delay of a predetermined time following operation of said fluid pressure operated valve means to its open position and before said predetermined reduction of the control pressure is reached to cause a penalty brake application.

5. The combination as defined in claim 4, wherein said restricted vent means comprises an audible signaling device whereby the vehicle operator is apprised each time the fluid pressure operated valve means operates to its open position in consequence of which the operator should effect a shifting of the position of the manually controlled valve device.

6. In a vehicle fluid pressure brake system, the combination with brake application valve means connected to a safety control pipe normally charged with fluid at a certain uniform control pressure and being operatively responsive to reduction of fluid pressure in said safety control to a certain low value to effect a penalty brake application on the vehicle, of:

(a) a fluid pressure responsive valve device interposed in said safety control pipe and having therein a control chamber constantly and restrictedly open to atmosphere, said fluid pressure responsive valve device being spring biased to an open position, in which said safety control pipe is vented to atmosphere for effecting reduction of fluid pressure therein at a controlled rate, and being operable, in response to fluid pressure in said control chamber above a critical value, to a closed position in which venting of said safety control pipe is cut off, (b) a source of fluid under pressure, (c) a pair of timing reservoirs, (d) pipe means via which pressurized fluid may be transmitted from one or the other of said timing reservoirs to said control chamber of said fluid pressure responsive valve device, and (e) a manually operable valve device interposed between said source of fluid under pressure and said timing reservoirs and between said timing reservoirs and said pipe means, (i) said manually operable valve device being operable from one position to a second position for connecting one of said timing reservoirs to said source of fluid under pressure for charging it with pressurized fluid therefrom while concurrently connecting the other timing reservoir to said control chamber via said pipe means for effecting operation of said fluid pressure responsive valve means to its said closed position, and being operable, from its said second position to its said one position for disconnecting said other timing reservoir from said control chamber and connecting it to said source of fluid under pressure for charging it with pressurized fluid therefrom while concurrently disconnecting said one timing reservoir from said source of fluid under pressure and connecting it to said control chamber for effecting restoration of said fluid pressure responsive valve device to its said closed position upon dissipation of fluid pressure in said control chamber to a value below said critical value, and thereby prevent reduction of fluid pressure in said safety control pipe to said certain low value.

7. A fluid pressure safety control system for use with a brake system of a railway type vehicle, said safety control system comprising:

(a) a control pipe normally charged with fluid at a preselected pressure and in which a reduction in excess of a certain amount from said preselected pressure is effective to initiate a penalty control operation, (b) atmospheric vent means via which reduction of fluid pressure in said control pipe may be effected at a restricted rate, (c) fluid pressure operated valve means interposed in said control pipe, said fluid pressure operated valve means being normally biased toward an open position, in which said control pipe is opened to atmosphere via said atmospheric vent means for effecting reduction of fluid pressure therein, and being operable responsively to fluid pressure above a critical value to a closed position in which said control pipe is closed to atmosphere and reduction of fluid pressure therein is terminated.

(d) a vent choke via which said fluid pressure operated valve means is constantly open to atmosphere and via which pressurized fluid supplied thereto is dissipated therefrom at a rate faster than that at which is is supplied,
(e) a supply pipe from which pressurized fluid may be provided for said fluid pressure operated valve means,
(f) a delivery pipe via which pressurized fluid may be delivered from said supply pipe to said fluid pressure operated valve means,
(g) a pair of timing reservoirs of respective predetermined volumes, and
(h) a manually operable valve device interposed between said supply pipe and said timing reservoirs and between said timing reservoirs and said delivery pipe, said manually operable valve device comprising:
(i) a valve member spring biased toward a first position, in which one of said timing reservoirs is connected to said supply pipe to be charged therefrom with fluid at a pressure above said critical value while the other timing reservoir is concurrently connected to said delivery pipe for effecting supply of pressurized fluid above said critical value to said fluid pressure operated valve means, and being operable to a second position in which said other timing reservoir is cut off from said delivery pipe and connected to said supply pipe to be recharged therefrom while said one reservoir is concurrently cut off from said supply pipe and connected to said delivery pipe, whereby reduction of fluid pressure in said control pipe in excess of said certain amount may be prevented by effecting restoration of said fluid pressure operated valve means to its closed position following operation thereof to its open position each time pressurized fluid supplied thereto from one or the other of said timing reservoirs is dissipated via said vent choke to a pressure below said critical value.

References Cited by the Examiner

UNITED STATES PATENTS 2,785,931   3/1957   Gorman _____ 303—19

ENGENE G. BOTZ, *Primary Examiner.*